US008746850B2

(12) United States Patent
Gerner et al.

(10) Patent No.: US 8,746,850 B2
(45) Date of Patent: Jun. 10, 2014

(54) PATTERNED HEATER TRACES FOR INKJET PRINTHEAD

(75) Inventors: Bradley James Gerner, Penfield, NY (US); Peter J. Nystrom, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 133 days.

(21) Appl. No.: 13/443,269

(22) Filed: Apr. 10, 2012

(65) Prior Publication Data

US 2013/0265369 A1 Oct. 10, 2013

(51) Int. Cl.
*B41J 2/05* (2006.01)
*B23P 17/00* (2006.01)

(52) U.S. Cl.
USPC ............................... 347/63; 347/61; 29/890.1

(58) Field of Classification Search
USPC ...................................................... 347/61, 63
See application file for complete search history.

(56) References Cited

U.S. PATENT DOCUMENTS 7,175,258 B2 * 2/2007 Cabal et al. ..................... 347/54
7,980,671 B2 7/2011 Nystrom et al.
8,083,323 B2 12/2011 Gulvin et al.

* cited by examiner

*Primary Examiner* — Lisa M Solomon
(74) *Attorney, Agent, or Firm* — MH2 Technology Law Group LLP

(57) ABSTRACT

A printhead for an ink jet printer can be formed as a plurality of substructures which are connected subsequent to inspection and/or testing. A substructure can include a semiconductor substrate such as a silicon substrate having a plurality of heater traces which are used to maintain a temperature of melted solid ink within a tolerance of a desired temperature. The traces can be accurately formed using semiconductor processing techniques. Testing and/or inspecting the substructures prior to assembly can reduce rework and scrap, and can allow the formation of printhead structures from a wide variety of materials.

17 Claims, 4 Drawing Sheets

PATTERNED HEATER TRACES FOR INKJET PRINTHEAD

FIELD OF THE EMBODIMENTS

The present teachings relate to solid inkjet printing devices including printheads and a method for forming the printhead.

BACKGROUND OF THE EMBODIMENTS

Solid inkjet printing technology includes ink in solid form which is heated to a printing temperature and ejected from a printhead nozzle by a plurality of ejectors (actuators). The ink can be deposited, for example, directly onto a print medium or onto a media transfer device such as a heated rotating drum which transfers the ink through physical contact with the print medium.

To provide a suitable print quality using solid inkjet printers, it is desirable to dispense ink from the ejectors at a temperature which is within a few degrees of a target temperature. The target temperature for solid ink can be between about 105° C. and 140° C. The temperature of the melted ink can be maintained by heating the printhead with a heated mass such as a flexible polyimide thin film layer with metal traces of gold or copper on the polyimide surface. The heater is assembled using adhesive layers, and heats the printhead which transfers the heat through contact with the ink as it flows through channels in the printhead. In another design, an inkjet device can include heaters wrapped around ink tubes leading to the print head. In yet another particular design, as described in U.S. Pat. No. 8,083,323 which is commonly assigned herewith and incorporated by reference in its entirety, a heater can be formed on a semiconductor wafer substrate and the ejector is formed using semiconductor manufacturing techniques.

SUMMARY OF THE EMBODIMENTS

The following presents a simplified summary in order to provide a basic understanding of some aspects of one or more embodiments of the present teachings. This summary is not an extensive overview, nor is it intended to identify key or critical elements of the present teachings nor to delineate the scope of the disclosure. Rather, its primary purpose is merely to present one or more concepts in simplified form as a prelude to the detailed description presented later.

An embodiment of the present teachings can include a method for forming an inkjet printhead, including forming a back end subassembly including an external manifold configured to receive liquid ink and forming a front end assembly including an aperture plate having a plurality of nozzles therein. The method can further include forming a substrate assembly using a method including forming a substrate having at least one resistive heater trace and forming a deflectable diaphragm over the substrate such that an air gap is located between the substrate and the deflectable diaphragm. The method can further include attaching the back end subassembly to the substrate assembly using a first adhesive layer and attaching the front end subassembly to the substrate assembly using a second adhesive layer, wherein the back end subassembly, the substrate assembly, and the front end subassembly together provide an ink port configured for the flow of liquid ink from the external manifold to one of the plurality of nozzles and the at least one heater trace is configured to heat liquid ink flowing from the external manifold to one of the plurality of nozzles.

An embodiment of the present teachings can further include an inkjet printhead, including a back end subassembly including an external manifold configured to receive liquid ink, a front end assembly including an aperture plate having a plurality of nozzles therein, and a substrate assembly attached to the back end subassembly and to the front end subassembly. The substrate assembly can include a substrate having at least one resistive heater trace and a continuous, generally planar deflectable diaphragm over the substrate which extends across a working surface of the substrate. The inkjet printhead can further include an air gap interposed between the substrate and the deflectable diaphragm, wherein the back end subassembly, the substrate assembly, and the front end subassembly together provide an ink port configured for the flow of liquid ink from the external manifold to one of the plurality of nozzles and the at least one heater trace is configured to heat liquid ink flowing from the external manifold to one of the plurality of nozzles.

An embodiment of the present teachings can further include an inkjet printer including an inkjet printhead. The inkjet printhead can include a back end subassembly including an external manifold configured to receive liquid ink, a front end assembly including an aperture plate having a plurality of nozzles therein, and a substrate assembly attached to the back end subassembly and to the front end subassembly. The substrate assembly can include a substrate having at least one resistive heater trace and a continuous, generally planar deflectable diaphragm over the substrate which extends across a working surface of the substrate. The inkjet printhead can further include an air gap interposed between the substrate and the deflectable diaphragm, wherein the back end subassembly, the substrate assembly, and the front end subassembly together provide an ink port configured for the flow of liquid ink from the external manifold to one of the plurality of nozzles and the at least one heater trace is configured to heat liquid ink flowing from the external manifold to one of the plurality of nozzles. The inkjet printer can further include a housing which encloses the inkjet printhead.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

Figure 1:
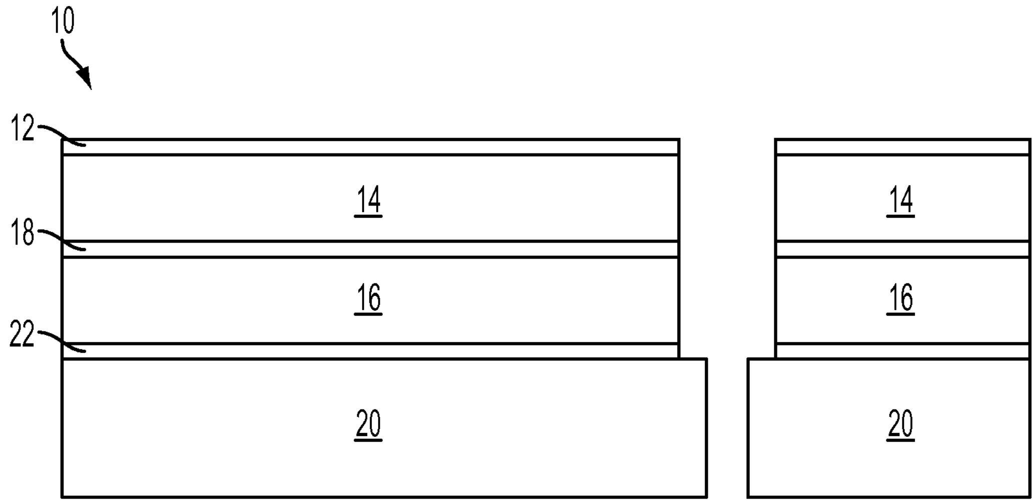
FIG. 1 is a cross section depicting an exemplary printhead back end structure according to an embodiment of the present teachings.

It should be noted that some details of the FIGS. have been simplified and are drawn to facilitate understanding of the present teachings rather than to maintain strict structural accuracy, detail, and scale. It will be understood that structures can include other elements which are not depicted for simplicity of explanation, and that various other elements which are depicted can be removed or modified.

DESCRIPTION OF THE EMBODIMENTS

Reference will now be made in detail to the embodiments of the present teachings, an example of which is illustrated in the accompanying drawings. Wherever possible, the same reference numbers will be used throughout the drawings to refer to the same or like parts.

As used herein, the word "printer" encompasses any apparatus that performs a print outputting function for any purpose, such as a digital copier, bookmaking machine, facsimile machine, a multi-function machine, electrostatographic device, etc. The word "polymer" encompasses any one of a broad range of carbon-based compounds formed from long-chain molecules including thermoset polyimides, thermoplastics, resins, polycarbonates, epoxies, and related compounds known to the art.

Accurate thermal control of solid ink as it is ejected from printhead nozzles is critical to produce a quality image. Ink which is either too viscous resulting from an insufficiently high temperature or too thin resulting from an excessively high temperature can result in an image with decreased print quality. An embodiment of the present teachings can providing a temperature-controlled heat source which is close to the ink during ejection from the nozzle and which can result in more accurate control of ink temperature than some conventional heating techniques. Further, an embodiment of the present teachings can simplify the printhead manufacturing process, for example by reducing the mask count and process steps required during semiconductor manufacture or assembly, resulting in decreased costs and materials, and improved yields compared to a process which requires a higher mask count or a more complex manual assembly. Additionally, a process in accordance with an embodiment of the present teachings can allow for the use of a wider variety of materials and more mature manufacturing processes than some known printhead manufacturing techniques. An embodiment of the present teachings can include a rigid substrate which has good thermal conduction, such as a semiconductor layer, a glass layer, or a metal layer, and resistive heater traces which can be formed at a high density using reliable assembly methods such as photolithographic manufacturing techniques. In contrast, a polyimide layer is flexible and has poor thermal conduction, resulting in decreased efficiency in heat transference to the ink.

An embodiment of the present teachings can include the formation of various printhead substructures, which are then subsequently connected together to provide a complete printhead such as a solid ink electrostatic printhead. Forming the substructures as discrete units can increase device yields compared to an additive process which builds each layer on a previous layer, for example because a defect in an additive process can result in scrap of a completed structure or more extensive rework to repair the defect.

Figure 2:
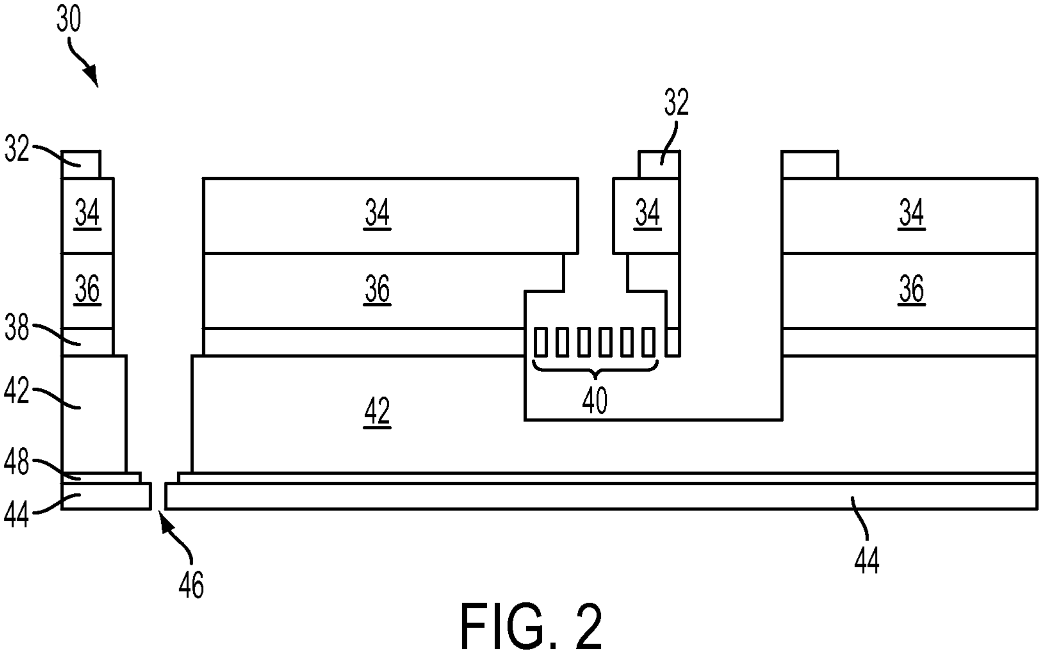
FIG. 2 is a cross section depicting an exemplary printhead front end structure according to an embodiment of the present teachings.
Figure 3:
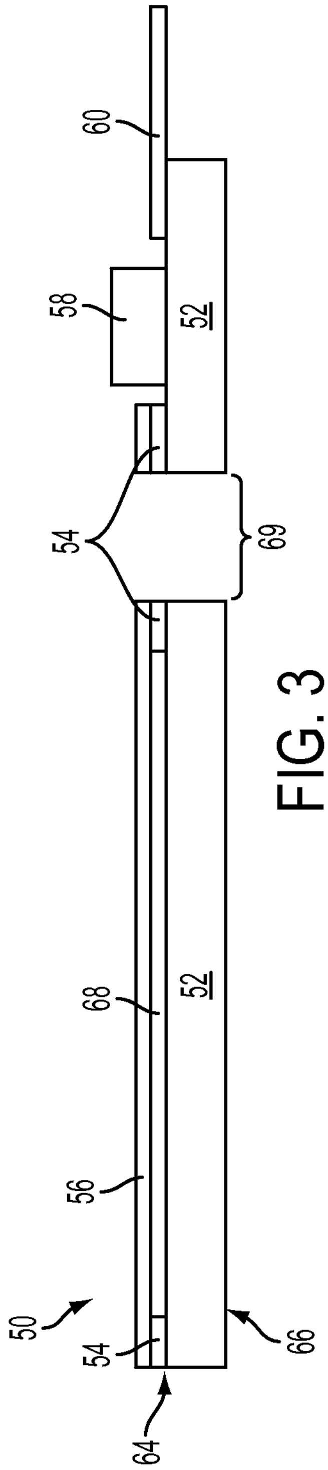
FIG. 3 is a cross section.
Figure 4:
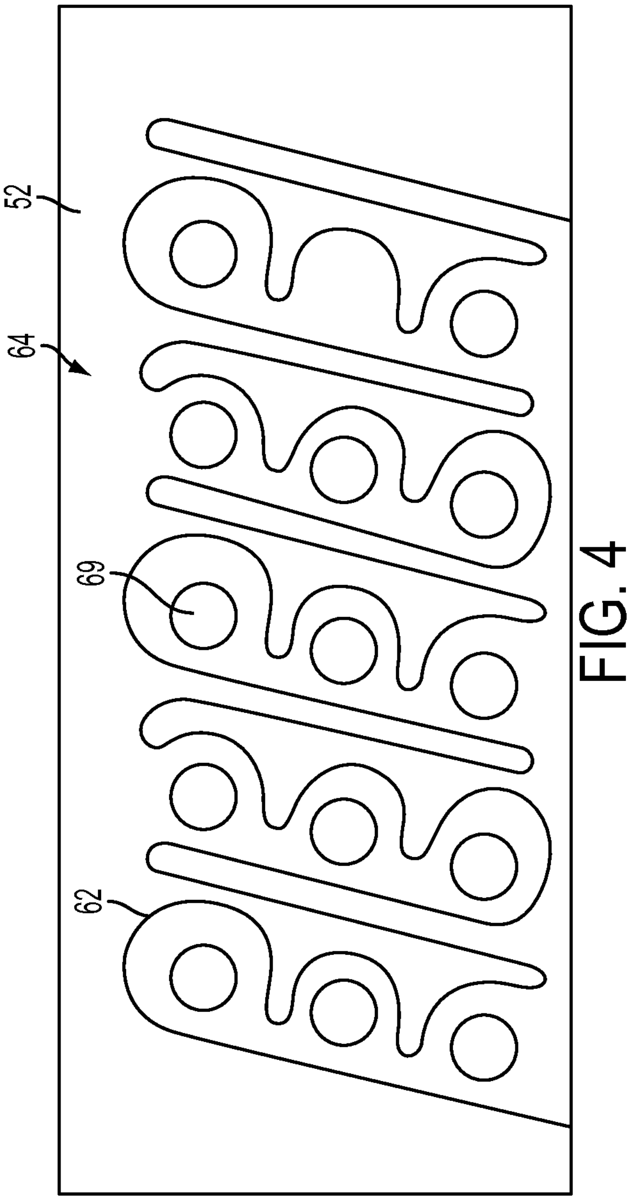
FIG. 4 is a plan view, depicting an exemplary semiconductor assembly according to an embodiment of the present teachings.

FIGS. 1-3 depict in cross section three different printhead subassemblies. In an embodiment, the various substructures of FIGS. 1-3 can be fabricated separately and assembled as described below to form the completed printhead subassembly depicted in the FIG. 5 cross section.

FIG. 1 depicts a solid inkjet printhead back end subassembly 10, which can include a compliant wall 12, an external manifold 14, and a diverter 16 attached to the external manifold 14 with an external manifold adhesive 18. FIG. 1 further depicts a boss plate 20 attached to the diverter 16 with a diverter attach adhesive 22. In an embodiment, the compliant wall 12 can include thermoplastic polyimide, the external manifold 14 can include aluminum, and the boss plate 20 can include stainless steel. The external manifold can receive liquid ink which has been melted from solid ink blocks, a gel ink, or another liquid ink in preparation for printing, and maintain the ink at a print temperature.

It will be understood that the structures of FIGS. 1-6 can be manufactured from various metals, polymers, and adhesives according to known processing techniques, and materials listed are exemplary. Further, FIGS. 1-6 depict one particular exemplary printhead design and it will be understood that various printhead structures can be added while other depicted structures can be removed or modified.

FIG. 2 depicts a solid inkjet printhead front end assembly 30, which can include a body 32, a vertical inlet 34, a separator 36, a particulate filter (rock screen) layer 38 including a rock screen 40, a front end manifold 42, and an aperture plate 44 having a nozzle 46. The aperture plate 44 can be attached to the manifold 42 with an aperture plate adhesive 48. In an embodiment, the body 32, the separator 36, and the front end manifold 42 can include a metal such as stainless steel, and the vertical inlet 34, the rock screen layer 38, the aperture plate adhesive 48, and the aperture plate 44 can each include one or more polymers such as DuPont™ Kapton® ELJ. The front end assembly 30 can be manufactured according to known processing techniques, such as a process including the use of a stack press.

FIG. 3 is a cross section depicting a substrate assembly 50 which can include a heater on a substrate for heating and/or maintaining the temperature of ink during use of the printhead. The substrate can be a semiconductor wafer section such as silicon or gallium arsenide, a metal layer, or a glass layer. For simplicity, the substrate assembly 50 will be described in terms of a semiconductor assembly processed using semiconductor and microelectronics manufacturing techniques such as photolithography, but it will be understood that the substrate can be selected from the other materials. The substrate assembly 50 can include a substrate 52 such as a semiconductor wafer section, glass layer, metal layer, etc., a standoff layer 54, a printhead diaphragm (membrane) 56, an application specific integrated circuit (ASIC) 58 attached to the semiconductor wafer section, and an interconnect layer 60 such as a flexible (flex) circuit or printed circuit board electrically coupled to the ASIC 58. As discussed above, the substrate 52 can be a silicon, gallium arsenide, metal, glass, etc. Further, the standoff layer 54 can be silicon dioxide and/or SU-8 photoresist. The diaphragm 56 can be a metal such as titanium, nickel, or a metal alloy, for example a metal alloy having a coefficient of thermal expansion (CTE) of between about 3 micrometers per meter for each degree Celsius (ppm/° C.) and about 16 ppm/° C., or a dielectric such as silicon nitride. FIG. 3 depicts an opening 69 etched through the substrate 52 and overlying layers 54, 56 which will provide a portion of an ink port 74.

In an embodiment, the substrate 52 includes a circuit pattern 62 (FIG. 4) on and/or within a working surface 64 of the substrate 52. The circuit pattern 62 can include a patterned metal layer, a patterned polysilicon layer, and/or a patterned implanted layer formed on the working surface 64 in accordance with known wafer processing techniques. In an embodiment, the ASIC 58 and interconnect layer 60 can be mounted flip-chip style to bond pads (not individually depicted for simplicity) included as part of the circuit pattern 62, for example using a ball grid array (BGA) or conductive bumps. It will be understood that the depiction of the substrate 52 of the FIG. 3 cross section is a small portion for a single ink port 74 and nozzle 46. The FIG. 4 plan view depicts a substrate 52 including a plurality of etched openings 69 through the substrate 52, each of which forms a portion of an ink port 74 in the completed device. Openings 69 can be formed at any location on the substrate 52, for example toward the center of the substrate 52, at the edges of the substrate 52, or both, depending on the design of the completed printhead.

The circuit pattern 62 further includes a resistive heater 84, 86 (FIG. 6, described below) which is interposed between the diaphragm 56 and a bottom surface 66 of the substrate 52. A thermal output by the resistive heater will depend on various design factors as understood by one of ordinary skill in the art, such as metal or alloy layer trace width, thickness, resistance, and composition or, for an implanted impurity trace region, a doping density (concentration), dopant composition, width and depth of the impurity trace region, etc. Resistance of the heater traces can be controlled using any available technique to provide a heater having a desired thermal output. In an embodiment, the diaphragm is a continuous, generally planar layer which extends over and across the working surface 64 of the substrate 52, and may include ink port openings therethrough as described below.

FIG. 3 further depicts an air gap 68 interposed between the diaphragm 56 and the substrate 52, and thus between the diaphragm 56 and the heater 84, 86. The air gap 68 allows the diaphragm 56 to deflect during use of the printhead to expel a quantity of ink from the nozzle 46, for example in response to digital instructions from ASIC 58 or another printer controller. Additionally, the FIG. 3 structure can include an etched opening 69 through the substrate 52, which will form part of an ink port in the completed structure. In plan view, the etched opening can be circular, oval, square, rectangular, etc. The completed structure can include a plurality of etched openings 69, with one etched opening from the plurality of etched openings associated with each ink port.

Once the three printhead subsections 10, 30, 50, are fabricated, they can be individually inspected and/or tested for proper functionality. If necessary, defective subsections can be reworked or discarded. Inspecting or testing the subsections prior to assembly can simplify rework. In another embodiment, a defective subsection can be scrapped prior to attachment to other subsections, thereby decreasing waste and printhead manufacturing costs over a printhead design which is manufactured layer by layer.

Figure 5:
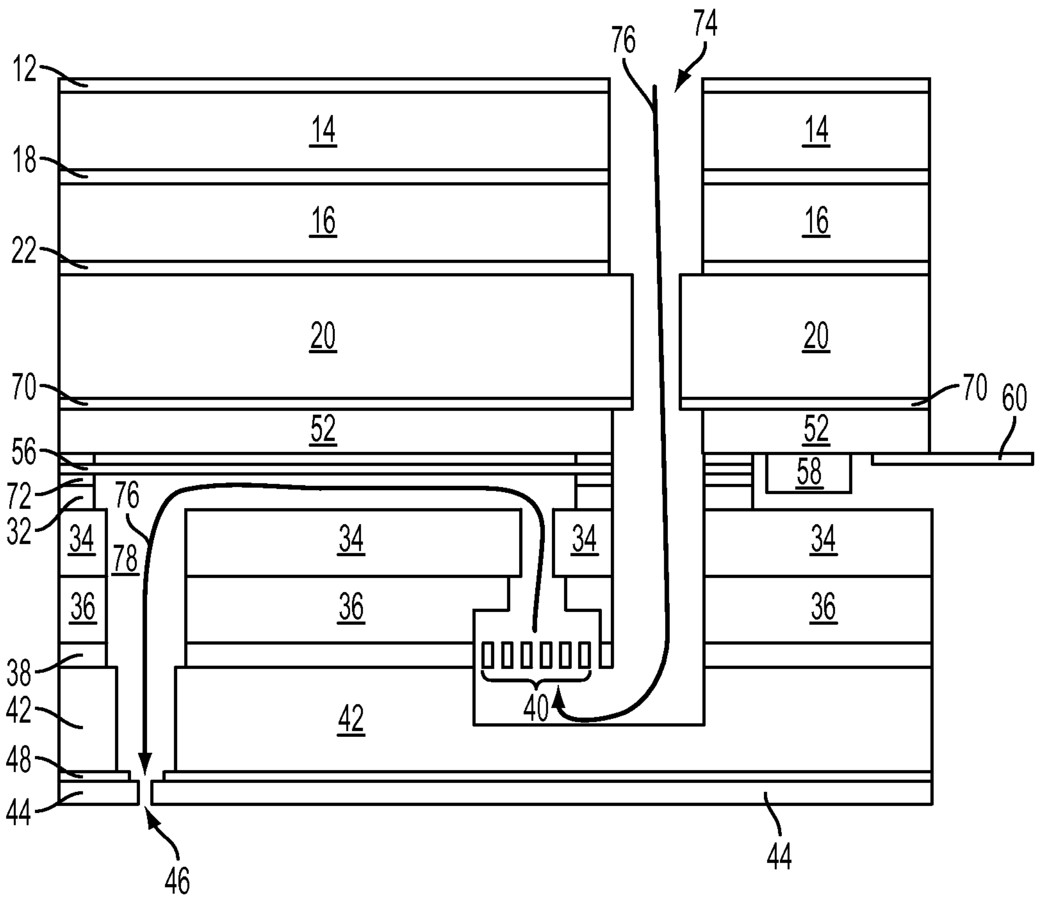
FIG. 5 is a cross section depicting the structures of FIGS. 1-3 after assembly.

After functionality of the printhead subsections has been evaluated and have passed testing or inspection, they can be aligned and assembled into a printhead structure similar to that depicted in the cross section of FIG. 5. The structure of FIG. 5 includes the substructures of FIGS. 1-4, and further includes a boss plate adhesive 70 which physically attaches the back end subassembly 10 of FIG. 1 to the substrate assembly 50 of FIG. 3. In the FIG. 5 embodiment, the boss plate adhesive 70 contacts the bottom surface 66 of the substrate 52 and a surface of the boss plate 20. FIG. 5 further depicts a diaphragm adhesive 72 which physically attaches the front end assembly 30 to the substrate assembly 50. In an embodiment, the diaphragm adhesive 72 contacts the stainless steel body 32 and the deflectable diaphragm 56 as depicted. The boss plate adhesive 70 and the diaphragm adhesive 72 can be a polymer or another adhesive.

After assembly, the subassemblies 10, 30, 50 together provide an ink port 74 for the passage of melted solid ink along an ink path 76 from the external manifold 14, through the rock screen 40, to the aperture plate 44, and out the nozzle 46.

Figure 6:
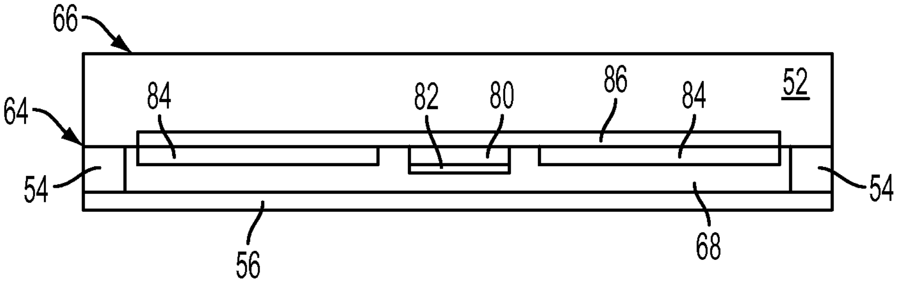
FIG. 6 is a cross section of a semiconductor assembly having heater traces in accordance with an embodiment of the present teachings.

The circuit layer 62 can include a plurality of first electrodes (80, FIG. 6) while the diaphragm 56 functions as a plurality of second electrodes, with one first electrode 80 per nozzle. The first electrode 80 of FIG. 6 is depicted as extending from the working surface 64 of the substrate 52, as it is formed from, for example, metal or polysilicon. In another embodiment, the first electrode can be formed as an implanted feature through a masked impurity doping process, in which an upper surface of the first electrode can be flush with the working surface 64 of the substrate 52. The plurality of first electrodes 80 can be controlled by ASIC 58 or another controller through conductive traces on or within the working surface 64 of the substrate 52. The diaphragm 56 can be continuous across the printhead, and may include an ink port opening therethrough. During operation of the printhead, a voltage is placed on one of the first electrodes 80 to activate the first electrode 80, which causes the portion of the diaphragm 56 which overlies the activated first electrode 80 to bend or deflect toward the activated first electrode 80. The bending or deflecting of the diaphragm 56 increases a volume of an ink chamber 78 and lowers a pressure within the ink chamber 78. This decrease in pressure within the ink chamber 78 causes a volume of melted ink to be drawn into the ink chamber 78 from the external manifold 14 through the ink port 74 along the ink path 76. When the voltage is removed to deactivate the first electrode 80, the diaphragm 56 returns to its relaxed state which decreases the volume of the ink chamber 78 and increases the pressure within the ink chamber 78. The pressure increase forces a volume of melted ink out of the ink chamber 78 through the nozzle 46.

FIG. 6 is a magnified cross section depicting a portion of the substrate 52 and a second electrode 80 formed, for example, from metal which is used to deflect the diaphragm 56 by the application of a voltage to the second electrode 80. The second electrode 80 can be an end of a trace which extends from, and is controlled by, the ASIC 58. A dielectric layer 82 prevents physical contact between the diaphragm (first electrode) 56 and the second electrode 80 during deflection of the diaphragm 56.

FIG. 6 further depicts a metal heater 84 over the working surface 64 of the substrate 52 in accordance with one embodiment of the present teachings. It will be appreciated that an electrostatic device electrode 80 may be larger than that depicted in FIG. 6. Generally, the scale of a completed structure may be different than depicted in the FIGS., which are drawn for simplicity of explanation rather than to maintain strict structural accuracy, detail, and scale. The metal heater 84 can be formed from the same layer as the first electrode 80 and electrically isolated from the first electrode 80 through patterning, for example using a photolithographic process. Both of the metal heater 84 and first electrode 80 can be electrically isolated from the substrate 52, particularly if the substrate 52 is formed from a conductive material such as metal or metal alloy using, for example, an oxide layer, a nitride layer, or another dielectric.

For simplicity, FIG. 6 further also depicts another embodiment of the present teachings wherein an impurity-doped implanted region within the substrate 52 forms traces for an implanted heater 86. It will be appreciated that a printhead in accordance with the present teachings can have either a metal trace heater 84 or an implanted trace heater 86, or possibly both a metal trace heater 84 and an implanted trace heater 86. Further, the first electrode 80 can be either a metal or polysilicon first electrode as depicted, or an implanted first electrode, which is not depicted for simplicity of explanation.

The heater traces in accordance with an embodiment of the present teachings can be used to maintain the printhead ink within a tolerance of a target temperature by heating the ink or by preventing excessive cooling of the ink during printing or during a standby state. A voltage can be applied to the resistive heater traces to cause an increase in a temperature of the heater traces. Thermal energy from the heater traces can be transferred to the ink within the ink path 76 by conduction through various printhead structures.

An embodiment of the present teachings can include a printhead having at least a 1200 dpi output, or at least a 2400 dpi output. In an embodiment, the printhead can be an electrostatic (electrostatically controlled) solid ink printhead, and a printer including the printhead. A semiconductor wafer section such as a silicon substrate is both stiff and thermally conductive, and the stiffness of silicon is ideal for building a jet stack. Further, silicon has a low coefficient of thermal expansion (CTE) and is very thermally conductive. Such a structure would allow for control of the thermal mass of the jet stack and would also allow the jetting performance to be controlled to provide consistent ink jetting results.

In an embodiment, a metal layer used to provide a diaphragm-deflecting electrode can also be used to provide metal heater traces. In another embodiment, impurity-doped traces can be used to provide implanted heater traces. In yet another embodiment, an impurity-doped diaphragm-deflecting electrode can be used.

Forming the printhead elements as separate subassemblies allows for front end structures to be formed from a larger variety of materials than some prior printheads, for example printheads which form the diaphragm (membrane) from silicon as part of a semiconductor wafer fabrication process. For example, the diaphragm can be formed from metal or silicon nitride, and various front end structures and back end structures can be formed from polymers and/or metals. Additionally, forming the structures from separate subassemblies allows each subassembly to be tested and/or inspected prior to assembly into a completed printhead, which can reduce scrap or rework.

Figure 7:
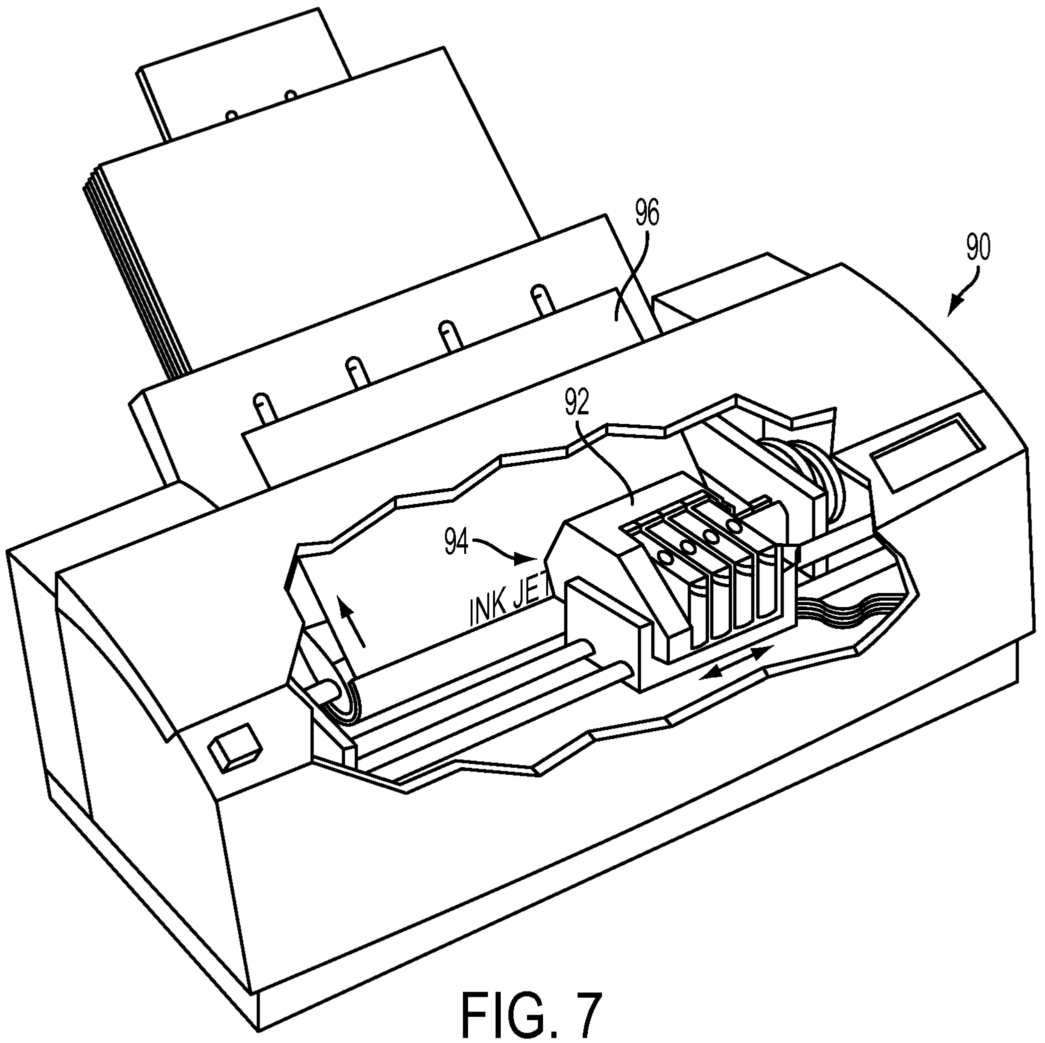
FIG. 7 is a perspective view of a printing device including a print head according to an embodiment of the present teachings.

FIG. 7 depicts a printer including a printer housing 90 into which at least one print head 92 has been installed. During operation, ink 94 is ejected from one or more nozzles 46 (FIG. 5) in accordance with an embodiment of the present teachings. The print head 92 is operated in accordance with digital instructions to create a desired image on a print medium 96 such as a paper sheet, plastic, etc. The print head 92 may move back and forth relative to the print medium 96 in a scanning motion to generate the printed image swath by swath. Alternately, the print head 92 may be held fixed and the print medium 96 moved relative to it, creating an image as wide as the print head 92 in a single pass. The print head 92 can be narrower than, or as wide as, the print medium 96. In another embodiment, the printhead 92 can print to an intermediate surface such as a rotating drum or belt (not depicted for simplicity) for subsequent transfer to a print medium.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g.--1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. A method for forming an inkjet printhead, comprising:

forming a back end subassembly comprising an external manifold configured to receive liquid ink;

forming a front end assembly comprising an aperture plate having a plurality of nozzles therein;

forming a substrate assembly using a method comprising:

forming a substrate having at least one resistive heater trace; and forming a deflectable diaphragm over the substrate such that an air gap is located between the substrate and the deflectable diaphragm;

attaching the back end subassembly to the substrate assembly using a first adhesive layer; and attaching the front end subassembly to the substrate assembly using a second adhesive layer, wherein the back end subassembly, the substrate assembly, and the front end subassembly together provide an ink port configured for the flow of liquid ink from the external manifold to one of the plurality of nozzles and the at least one heater trace is configured to heat liquid ink flowing from the external manifold to one of the plurality of nozzles.

2. The method of claim 1, further comprising implanting the substrate with an impurity dopant to form the at least one resistive heater trace within the substrate.

3. The method of claim 1, further comprising patterning a metal layer over a working surface of the substrate to form the at least one heater trace.

4. The method of claim 3, wherein the patterning of the metal layer to form the at least one heater trace further comprises patterning a plurality of first electrodes configured to deflect the diaphragm upon application of a voltage to the plurality of first electrodes, wherein the diaphragm provides a plurality of second electrodes.

5. The method of claim 1, further comprising:

forming the deflectable membrane from a material selected from the group consisting of titanium, nickel, metal alloy, and silicon nitride; and forming the front end subassembly using a method comprising:

attaching a stainless steel separator to a polymer rock screen layer; and attaching the polymer rock screen layer to a stainless steel manifold.

6. The method of claim 1, further comprising:

forming the deflectable membrane from a material having a coefficient of thermal expansion of between about 3 ppm/° C. and about 16 ppm/° C.; and forming the front end subassembly using a method comprising:

attaching a stainless steel separator to a polymer rock screen layer; and attaching the polymer rock screen layer to a stainless steel manifold.

7. The method of claim 1 further comprising selecting the substrate from a material selected from the group consisting of silicon, gallium arsenide, glass, and metal.

8. The method of claim 1, further comprising:

selecting the substrate from a material selected from the group consisting of metal, metal alloy, and glass; and patterning a metal layer over a working surface of the substrate to form the at least one heater trace.

9. An inkjet printhead, comprising:

a back end subassembly comprising an external manifold configured to receive liquid ink;

a front end assembly comprising an aperture plate having a plurality of nozzles therein;

a substrate assembly attached to the back end subassembly and to the front end subassembly, the substrate assembly comprising:

a substrate having at least one resistive heater trace; and a continuous, generally planar deflectable diaphragm over the substrate which extends across a working surface of the substrate; and an air gap interposed between the substrate and the deflectable diaphragm, wherein the back end subassembly, the substrate assembly, and the front end subassembly together provide an ink port configured for the flow of liquid ink from the external manifold to one of the plurality of nozzles and the at least one heater trace is configured to heat liquid ink flowing from the external manifold to one of the plurality of nozzles.

10. The inkjet printhead of claim 9, further comprising an impurity dopant region within the substrate which provides the at least one resistive heater trace.

11. The inkjet printhead of claim 9, further comprising a patterned metal layer over a working surface of the substrate which provides the at least one resistive heater trace.

12. The inkjet printhead of claim 11, wherein the patterned metal layer further comprises a plurality of first electrodes configured to deflect the diaphragm upon application of a voltage to the plurality of first electrodes and the diaphragm provides a plurality of second electrodes.

13. The inkjet printhead of claim 9, wherein the deflectable membrane comprises a material selected from the group consisting of titanium, nickel, metal alloy, and silicon nitride.

14. The inkjet printhead of claim 9, wherein the deflectable membrane comprises a material having a coefficient of thermal expansion of between about 3 ppm/° C. and about 16 ppm/° C.

15. The inkjet printhead of claim 9, wherein the substrate comprises a material selected from the group consisting of silicon, gallium arsenide, glass, and metal.

16. The inkjet printhead of claim 9, further comprising:

the substrate comprises a material selected from the group consisting of metal, metal alloy, and glass; and a patterned metal layer over a working surface of the substrate which provides the at least one heater trace.

17. An inkjet printer, comprising:

an inkjet printhead, comprising:

a back end subassembly comprising an external manifold configured to receive liquid ink;

a front end assembly comprising an aperture plate having a plurality of nozzles therein;

a substrate assembly attached to the back end subassembly and to the front end subassembly, the substrate assembly comprising:

a substrate having at least one resistive heater trace; and a continuous, generally planar deflectable diaphragm over the substrate which extends across a working surface of the substrate; and an air gap interposed between the substrate and the deflectable diaphragm, wherein the back end subassembly, the substrate assembly, and the front end subassembly together provide an ink port configured for the flow of liquid ink from the external manifold to one of the plurality of nozzles and the at least one heater trace is configured to heat liquid ink flowing from the external manifold to one of the plurality of nozzles; and a housing which encloses the inkjet printhead.

* * * * *